United States Patent
Payne et al.

(10) Patent No.: US 7,111,520 B2
(45) Date of Patent: *Sep. 26, 2006

(54) INCREASED SENSITIVITY FOR LIQUID METER

(75) Inventors: Edward A. Payne, Greensboro, NC (US); Seifollah S. Nanaji, Greensboro, NC (US); Brent K. Price, Winston-Salem, NC (US)

(73) Assignee: Gilbarco Inc., Greensboro, NC (US)

( * ) Notice: Subject to any disclaimer, the term of this patent is extended or adjusted under 35 U.S.C. 154(b) by 133 days.

This patent is subject to a terminal disclaimer.

(21) Appl. No.: 10/953,168

(22) Filed: Sep. 29, 2004

(65) Prior Publication Data

US 2005/0039546 A1 Feb. 24, 2005

Related U.S. Application Data

(63) Continuation-in-part of application No. 10/227,746, filed on Aug. 26, 2002, now Pat. No. 6,854,342.

(51) Int. Cl.
*G01F 1/05* (2006.01)

(52) U.S. Cl. .................................. 73/861.79

(58) Field of Classification Search .............................. 73/861.71–861.79, 261; 141/59, 94
See application file for complete search history.

(56) References Cited

U.S. PATENT DOCUMENTS

| | | | |
|---|---|---|---|
| 4,122,524 A | 10/1978 | McCrory et al. | 705/413 |
| 4,535,637 A | 8/1985 | Feller | 73/861.77 |
| 5,325,729 A | 7/1994 | Goodson et al. | 73/861.91 |
| 5,433,118 A * | 7/1995 | Castillo | 73/861.77 |
| 5,447,062 A | 9/1995 | Kopl et al. | 73/261 |
| 5,464,466 A | 11/1995 | Nanaji et al. | 94/45 |
| RE35,238 E | 5/1996 | Pope | 141/59 |
| 5,638,174 A * | 6/1997 | Henderson | 73/861.77 |
| 5,689,071 A | 11/1997 | Ruffner et al. | 73/861.84 |
| 5,831,176 A | 11/1998 | Morgenthale et al. | 73/861.77 |
| 5,985,002 A | 11/1999 | Grantham | 95/47 |
| 6,170,539 B1 | 1/2001 | Pope et al. | 141/59 |
| 6,196,065 B1 * | 3/2001 | Henksmeier et al. | 73/261 |
| 6,250,151 B1 * | 6/2001 | Tingleff et al. | 73/261 |
| 6,336,479 B1 | 1/2002 | Nanaji | 141/4 |
| 6,338,369 B1 | 1/2002 | Shermer et al. | 141/83 |
| 6,386,246 B1 | 5/2002 | Pope et al. | 141/59 |
| 6,397,686 B1 | 6/2002 | Taivalkoski et al. | 73/861.78 |
| 6,854,342 B1 * | 2/2005 | Payne et al. | 73/861.79 |

* cited by examiner

*Primary Examiner*—Harshad Patel
(74) *Attorney, Agent, or Firm*—Withrow & Terranova, PLLC (57) ABSTRACT

A lower cost meter comprised of an inner housing constructed out of a high permeable material surrounded by an outer housing constructed out of a lower cost, lower permeable material. A port is placed in the outer housing that runs down to the surface of the inner housing to detect the rotation of a rotational component that rotates inside the meter as fluid or gas flows through the meter. A sensor is placed in the port to detect rotation of the rotational component through the lower permeable material inner housing. The lower cost meter can be used for any application for measuring fluid or gas, and may be used in a service station environment for measuring fuel or vapor in vapor recovery applications.

57 Claims, 8 Drawing Sheets

INCREASED SENSITIVITY FOR LIQUID METER

RELATED APPLICATION

This application is a continuation-in-part patent application of patent application Ser. No. 10/227,746 entitled "Increased sensitivity for turbine flow meter," filed on Aug. 26, 2002, now U.S. Pat. No. 6,854,342, which is incorporated herein by reference in its entirety.

FIELD OF THE INVENTION

The present invention relates to a liquid meter design for measurement of liquid or gaseous materials that yields increased sensitivity for detection of moving components within the meter that are used to detect volume or flow rate of a liquid with a lower production cost.

BACKGROUND OF THE INVENTION

Liquid meters are used for a variety of applications where it is desired to measure the flow rate or volume of a given fluid or gaseous material. Some are positive displace meters, meaning that a volume of liquid is displaced by the meter and thus the volume of the liquid passing through the meter is known. Other meters are inferential meters, meaning that the actual displacement of the liquid or gaseous material is not measured. An inferential meter uses some other characteristic other than actual displacement to measure flow rate or volume. Inferential meters sometimes have advantages over positive displacement meters, including smaller size. For either type of meter, it may be important to find methods of reducing the cost of the meter.

One example of a positive displacement meter is known as an axial meter, like that described in U.S. Pat. No. 5,447,062. The axial meter described in this patent measures the volume of a fluid or gaseous material by determining the number of rotations of the interlocked spindles inside the housing of the meter. The meter is comprised of a housing that defines a flow path. Interlocked spindles, which are rotating components. Inside the flow path rotate as liquid passes through the housing. Each rotation of a spindle displaces a known volume through the meter. A magnetic detector in the form of an exciter disk is used to detect the rotation of the spindles like that described in U.S. Pat. No. 6,250,151. Other types of detectors, such as a Hall-effect sensor, may also be countersunk into the housing of the meter to detect the rotation of the spindles as described in U.S. Pat. No. 6,397,686.

One example of an inferential meter is known as a turbine flow meter, like that described in U.S. Pat. No. 5,689,071. The turbine flow meter described in this patent measures the flow rate of a fluid or gaseous material by determining the number of rotations of a turbine rotor located inside the flow path of the meter. The turbine rotors are rotating components. The meter is comprised of a hollow housing that includes a turbine rotor on a shaft inside the flow path created by the housing. The housing is constructed out of a high permeable material, such as stainless steel.

In the example of the positive displacement and inferential meter above that includes sensors in the meter housing, as m enters the inlet port of the meter, the material passes through the rotating component causing the rotating component to rotate. The rotation of the rotating component is sensed by a sensor As the rotating component rotates, the sensor causes a a pulse stream to be generated in response. The pulses occur at a repetition rate (pulses per second) proportional to rotation of the spindles or turbine rotor and hence proportional to the measured volume and/or rate of material flow.

In some meters, the sensor is countersunk in a port that is drilled into the housing to be placed in close proximity to the rotating component for detection of rotation. However, the port that contains the sensor does not extend all the way through the housing to the inner portion so that the sensor is not exposed to the flow path. The sensor detects the rotation of the rotating components through the housing using an electrical or magnetic signal. Since the housing is constructed out of a high permeable material, the sensor must detect the rotation of the spindles or rotor vanes through the housing of the meter. One method to reduce the cost of the meter is to use a lower costhousing material since the housing material comprises a large majority of the material used in the meter. However, less costly materials, such as aluminum for example, have a low permeability thereby making it difficult or impossible for the sensor to detect the rotation of the rotating components through housing.

Therefore, it is desirable to find a technique to use a lower cost, lower permeable material for the housing of a meter without disturbing the performance of the sensor.

SUMMARY OF THE INVENTION

The present invention relates to a lower cost meter. The meter is comprised of an outer housing constructed out of a low permeable material forming an inlet port on one end of the outer housing and an outlet port on the other end of the outer housing. A shaft is supported inside the outer housing along an axis parallel to the outer housing. A rotating component located inside the housing rotates when the material flows through the inlet port. An orifice is contained in the outer housing that forms a first port wherein a first end of the orifice extends outward to the outer surface of the outer housing, and the second end of the orifice extends down to a higher permeable inner housing proximate to the rotating component. A first sensor that can detect turbine rotor rotation, is mounted within a first port and is excited by a signal received through the inner housing from the rotating component as the rotating component rotates when fluid passes through the meter.

The inner housing may be comprised of a hollow, cylindrical shaped high permeable material that is placed between the shaft and the outer housing such that the inner housing completely surrounds the shaft and the turbine rotors. Alternatively, the inner housing may be a plug of high permeable material that is placed inside an orifice in the outer housing proximate to the rotating component in order to conserve costs by providing low permeable material. The rotating component can take different forms. For example, if the meter is a turbine flow meter, the rotating component may be a turbine rotor as discussed above. If the meter is a axial positive displacement meter, the rotating component may be a spindle as discussed above.

The meter may contain more than one rotating component and more than one port and sensor so that a controller or control system can determine the ratio of the rotation speed of one rotating component to another to determine the flow rate or volume of the fluid or gas flowing through the meter. Also, more than one port and sensor may be provided for a single rotating component so that the direction of rotation of the rotating component can be detected to detect backflow of gas or liquid in the meter.

The meter may be used in a fuel dispenser application. The meter may be used to measure fuel in a fuel dispenser, the vapor being returned to the underground storage tank in a stage two vapor recovery fuel dispenser, or vapor or air released to atmosphere from the ullage area of an underground storage tank when a pressure relief valve in a vent stack is opened on the underground storage tank to relieve pressure.

The meter data in a fueling environment may be used to determine the vapor-to-liquid (V/L) ratio of a stage two vapor recovery dispenser to adjust the vapor recovery system to operate within desired V/L limits or to provide diagnostic data about measured fuel, vapor and/or air to a site controller or tank monitor for compliance monitoring and reporting.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is related to a lower cost meter for measuring the flow rate and/or volume of a gas or liquid. The meter is comprised of an inner housing constructed out of a high permeable material surrounded by an outer housing constructed out of a lower cost, lower permeable material. A port is placed in the outer housing that runs down to the surface of the inner housing to detect the rotation of a rotating component inside the meter that rotate inside the fluid meter as fluid or gas flows through the meter. A sensor that detects a signal or a change in an electric or magnetic field is placed in the port to detect rotation of the rotating component. When a signal or field is used by the sensor to detect rotation of the rotating component, the signal or field penetrates through the higher permeable inner housing. This signal or field is used to determine the flow rate and/or volume of the fluid or gas passing through the meter.

Because the sensor is placed at the surface of the higher permeable inner housing material instead of the surface of the lower permeable outer housing, detection of rotation of the rotating component is possible. If the housing of meter was totally constructed out of a low permeable material, and/or the sensor was not placed at the surface of a higher permeable material to allow a signal or field to penetrate through the housing, the meter would either not work correctly or be defective in its operation since the sensor may not detect the signal or field through the housing. It should be noted that the present invention can be used in conjunction with any kind of meter, including an inferential or positive displacement meter.

Figure 1A:
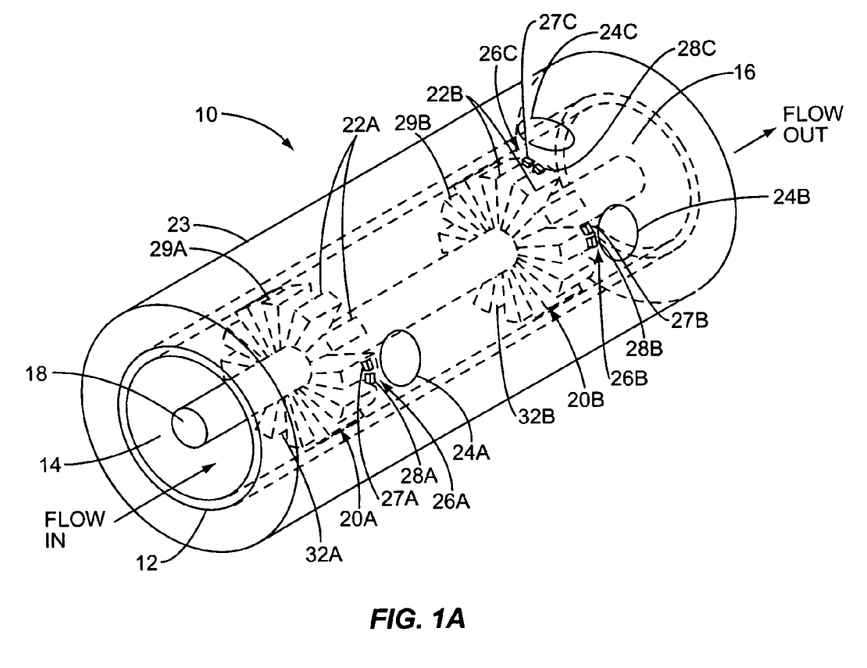
FIG. 1A is a schematic diagram of the turbine flow meter according to one embodiment the present invention.

FIG. 1A illustrates one type of meter known as a turbine flow meter 10. This turbine flow meter 10 is like that described in U.S. Pat. No. 5,689,071 entitled "Wide range, high accuracy flow meter," incorporated herein by reference in its entirety. The turbine flow meter 10 is comprised of an inner housing 12 that is constructed out of a high permeable material, such as monel, a nickel-copper alloy, steel, stainless steel, or 400-series non-magnetic stainless steel, for example. The inner housing 12 is hollow and forms an inlet port 14 and an outlet port 16 for fluid or gas to enter into the flow meter 10 and to leave the flow meter 10, respectively. A shaft 18 is placed internal to the internal housing 12 to support one or more rotating components 20A, 20B, which are turbine rotors 20A, 20B in the present example. The turbine rotor 20A may be also called the "first turbine rotor," and the turbine rotor 20B may also be called the "second turbine rotor."

The turbine rotors 20A, 20B rotate in an axis perpendicular to the axis of the shaft 18. The turbine rotors 20A, 20B contain one or more vanes 22A, 22B, also known as blades. As the fluid or gas passes through the inlet port 14 and across the vanes 22A, 22B of the turbine rotors 20A, 20B, the turbine rotors 20A, 20B and vanes 22A, 22B rotate at a speed proportional to the rate of flow of the gas or liquid flowing through the turbine flow meter 10. The proportion of the rotational speed of the first turbine rotor 20A to the second turbine rotor 20B, as determined by counting the vanes 22A, 22B passing by the Hall-effect sensor 26 (discussed below) to determine the flow rate of the fluid or gas passing through the meter 10, as is described in U.S. Pat. No. 5,689,071, previously referenced herein. It is noted that the turbine flow meter 10 can be provided with only one turbine rotor 20 to detect flow rate as well. Please note that any other type of sensing device or sensor may be used that can detect a signal or change in field to detect rotation of the turbine rotors 20A, 20B, including but not limited to a tachometer sensor, interrupters, gyro & inertial sensors, a capacitance sensor, a ferrous or other metal detecting sensor, and a potentiometer. In the present invention, the inner housing 12 is surrounded by an outer housing 23 constructed out of a lower permeable material than the inner housing 12, including but not limited to aluminum, plastic, ceramic, ferrous metal, and non-ferrous metal. Lower permeable materials are typically cheaper than higher permeable materials and therefore provide a lower cost of manufacture. Since the housing structure of the turbine flow meter 10 comprises a majority of the amount of raw material used in constructing a turbine flow meter 10, all savings that can be achieved by using a lower cost material to form the outer housing 23 will be a significant cost reduction in the overall cost of the turbine flow meter 10.

In order to detect the rotation of the turbine flow meter 10 to then derive the flow rate or volume of the fluid flowing through the turbine flow meter 10, one or more ports 24A, 24B are included in the outer housing 23 during the manufacture of the meter 10 so that the ports 24A, 24B extend all the way to the surface area of the inner housing 12. The port 24A may be called the "first port," and the port 24B may be called the "second port." The ports 24A, 24B allow the sensors 26 to be placed inside each of the ports 24A, 24B at the surface area of the inner housing 12. The sensors 24 may be like the Hall-effect sensors that are described in U.S. Pat. No. 6,397,686, which is hereby incorporated by reference in its entirety.

By way of background, it is well known to those skilled in the art that the Hall-effect involves the development of a potential difference across a current-carrying conductor when the conductor is subjected to a magnetic field. The potential difference is developed at right angles to both the current flow and to the magnetic field. Accordingly, if the magnetic system that is coupled to the Hall-effect conductors is arranged or operated in such a manner as to develop a non-uniform magnetic field (e.g., the magnetic field varies in a periodic manner), this magnetic field variation will produce a corresponding variation in the potential difference that is induced in the conductors according to the Hall-effect. Sensors that detect variations in the magnetic field experienced by the individual sensing elements (e.g., current-carrying conductor) can be constructed based upon this Hall-effect phenomenon.

In accordance with one aspect of the present invention, the turbine rotors 20A, 20B are modified to include at least one region of discontinuity 29A, 29B defined, which is provided in such a manner as to exhibit magnetic properties. For example, if rotors 20A, 20B are made of a magnetic or ferrous material, the regions of discontinuity 29A, 29B in the outer surface of rotor 20A, 20B will generate a characteristic magnetic flux that is detectably distinct from the magnetic flux generated by the adjacent surface regions, which conform to the conventional cylindrical shape for the rotor 20A, 20B. As will be described further, these variations in magnetic flux associated with the regions of discontinuity 29A, 29B are detected by the Hall-effect sensors 26A, 26B and are used to provide a measure of the rotational velocity of rotors 20A, 20B.

The development of a Hall-effect within the Hall-effect sensors requires, as is conventionally known, the introduction of the sensor elements into a magnetic field. A magnet is placed in the sensor creating a field between the sensor and steel rotor. If the rotor is made of a non-ferrous material, a steel ring can be pressed onto the rotor thus having the magnetic properties. The magnet can also be placed on the rotor rather than in the sensor, thus creating the required field.

Figure 1B:
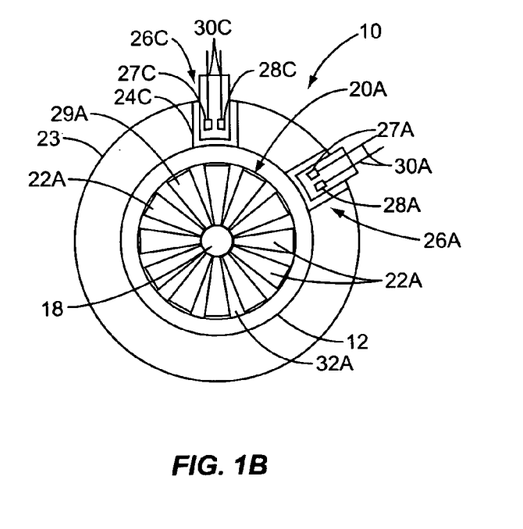
FIG. 1B illustrates a side view of FIG. 1A.

FIG. 1B illustrates a side view of the turbine flow meter 10 illustrated in FIG. 1A. The shaft 18 and turbine rotors 20A, 20B with vanes 22A, 22B, located inside the inner housing 12 are illustrated. The thickness of the inner housing 12 is much less than the thickness of the outer housing 23; however, these thicknesses are a matter of design choice and the present invention is not limited to any particular thickness. What is important is that the outer housing 23 be constructed of a lower cost material and of a less permeable material than the inner housing 12.

Referring to FIG. 1B illustrating three Hall-effect sensors 26A, 26C that are present in each of the ports 26A, 26B respectively, the sensors 26A, 26C comprise a first Hall-effect sensing element 27A, 27C and a second Hall-effect sensing element 28A, 28C having respective electrical leads 30A, 30C. Note that in FIG. 1B, sensor 26B is not shown since it is located behind sensor 26A. Therefore, the description of FIG. 1B will not refer to sensor 26B, but instead to sensor 26A, 26C and their elements, but the description is equally applicable to sensor 26B.

The discrete Hall-effect elements 27A, 27C, 28A, 27C may be provided in any conventional form known to those skilled in the art such as a current-carrying conductor. In accordance with the present invention, the Hall-effect elements 27A, 27C, 28A, 28C are placed in a sufficiently proximate relationship relative to turbine rotors 20A, 20B so as to enable each one of the recessed areas 32A, 32B in the turbine rotors 20A, 20B to exert a characteristic magnetic influence upon each of the Hall-effect elements 27A, 27C, 28A, 27C as each one of the recessed areas 32A, 32B rotates in succession past elements 27A, 27C, 28A, 27C.

In the embodiment illustrated in FIGS. 1A and 1B, two ports 24A, 24B are provided for sensors 26A, 26B, 26C to be used. However, it is noted that an alternative embodiment of the present invention only involves use of one turbine rotor 20 with one port 24 and one sensor 26 since the flow rate of the fluid or gas passing through the meter 10 can be measured by just using the rotation speed of one turbine rotor.

In yet another variation of the present invention, a third port 24C and sensor 26C may be provided, as illustrated in FIGS. 1A and 1B, having electrical leads 30C. This additional port 24C is placed in proximity to the turbine rotor 20B such that the turbine rotor 20B has two ports 24B, 24C and two sensors 26B, 26C. Use of two sensors 26A, 26B via ports 24A, 24B to detect rotation of one turbine rotor 20B allows detection of direction of rotation of the turbine rotor 20B as well as the speed. If the turbine rotor 20B is rotating in a direction opposite from a normal direction, this indicates that a backflow of gas or liquid is passing back through the meter 10. In this event, the measured backflow of gas or liquid, as measured by the detection of the rotation of the vanes 22A, 22B on the turbine rotor 20B, is subtracted from the total flow rate or volume of the gas or liquid passing through the meter 10 to arrive at an accurate measurement. It should be noted that the third port 24C may be provided with either turbine rotor 20A, 20B.

Figure 2A:
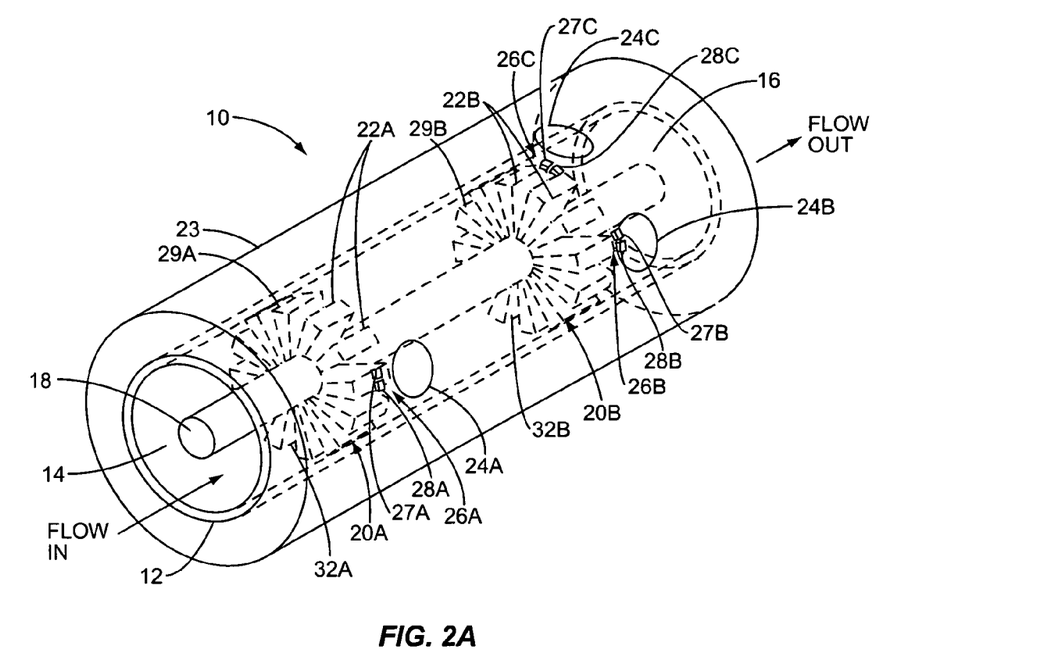
FIG. 2A is a schematic diagram of a turbine flow meter according to an alternative embodiment of the present invention.
Figure 2B:
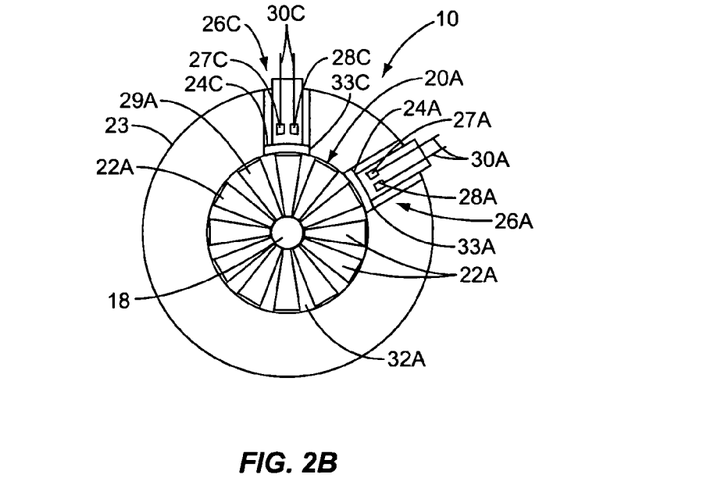
FIG. 2B illustrates a side view of FIG. 2A.

FIGS. 2A and 2B (a side view of FIG. 2A) illustrate another embodiment of the turbine flow meter 10 that may be used with the present invention. In FIGS. 2A and 2B, the body of the turbine flow meter 10 only includes a single outer housing 23 comprised of a lower permeable material. The ports 24A, 24B, 24C, if provided, are formed by holes drilled all the way through the outer housing 23 such that the ports 24A, 24B, 24C (if provided) form an orifice from the outer surface of the outer housing 23 all the way to the inside of the flow meter 10 without interruption or blockage. Next, plugs 33A, 33B (not shown due to view of FIG. 2B), 33C, which are constructed out of higher permeable material than the outer housing 23, are placed inside the ports 24A, 24B, 24C. One end of the plugs 33A, 33B (not shown), 33C is substantially flush with the inside of the inner housing 23 of the meter 10. The plugs 33A, 33B (not shown), 33C are typically less in length that the length of the ports 24A, 24B, 24C so that sensors 26A, 26B, 26C may still be placed inside the ports 24A, 24B, 24C resting against or in close proximity to the other end of the plugs 33A, 33B (not shown), 33C. However, the plugs 33A, 33B (not shown), 33C could extend out of the outer housing 23 if desired.

In this manner, the rotation of the vanes 22A, 22B will still be detectable since the higher permeable plugs 33A, 33B, 33C are placed in between the sensors 26A, 26B, 26C and the vanes 22A, 22B. This allows even less of the higher cost, higher permeable material to be used in the construction of the turbine meter 10 to yield even a lower manufacturing cost. It should be noted that the embodiment illustrated in FIGS. 2A and 2B may be provided with one port 24A, two ports 24A, 24B or the three ports 24A, 24B, 24C as illustrated in FIGS. 1A and 1B in any combination.

Figure 3:
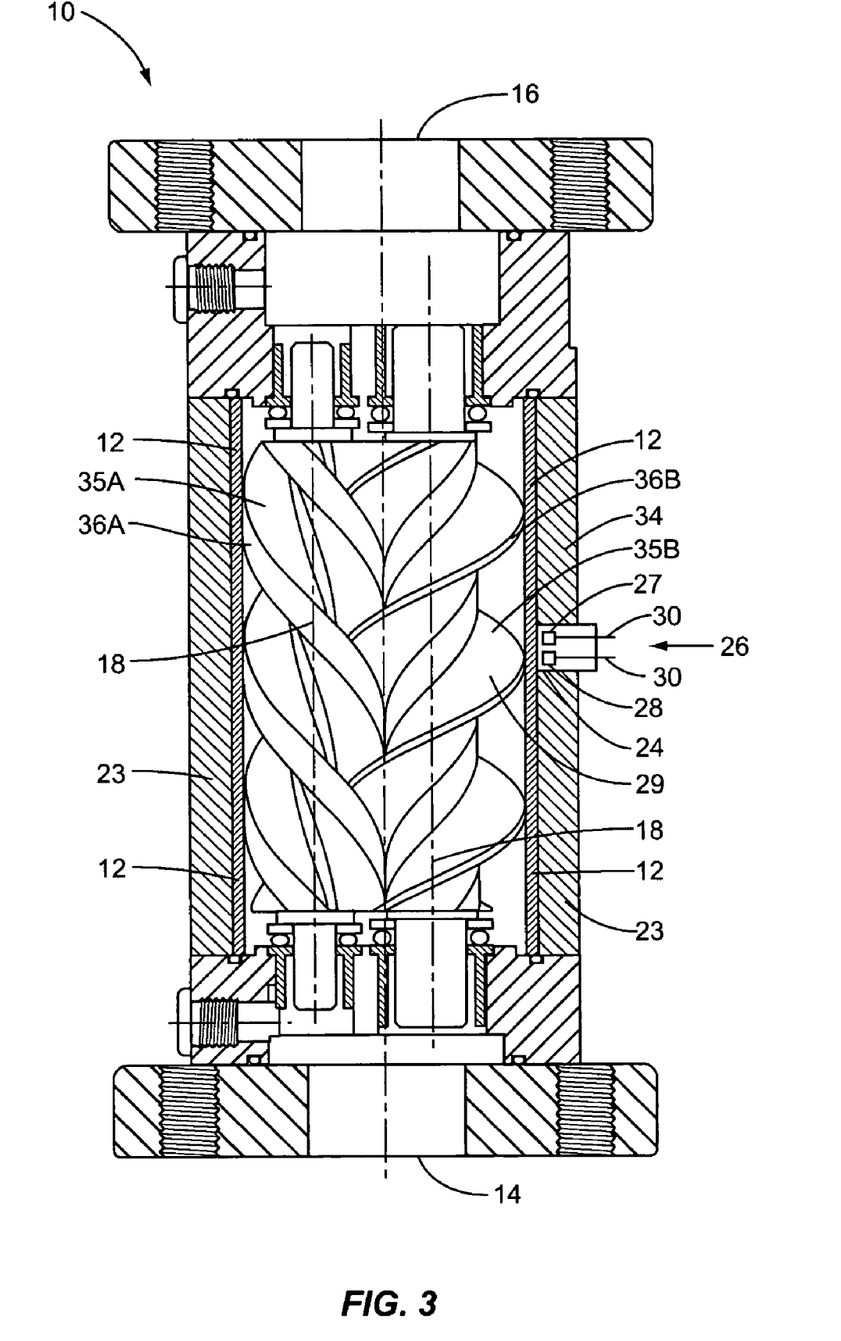
FIG. 3 is a schematic diagram of an axial meter according to one embodiment of the present invention.

FIG. 3 illustrates another type of meter known as an axial positive displacement meter 10. This meter 10 is like that described in U.S. Pat. Nos. 5,447,062 and 5,250,151 incorporated herein by reference in their entireties. The meter 10 is comprised of an inner housing 12 that is constructed out of a high permeable material, such as monel, a nickel-copper alloy, steel, stainless steel, or 400-series non-magnetic stainless steel, for example. The inner housing 12 is hollow and forms an inlet port 14 and an outlet port 16 for fluid or gas to enter into the meter 10 and to leave the meter 10, respectively. A shaft 18 is placed internal to the internal housing 12 to support one or more rotating components in the form of spindles 35A, 35B. In the meter 10 in FIG. 3, there are two interlocking spindles 35A, 35B that rotate as fluid or gas passes through the meter 10.

The spindles 35A, 35B rotate in an axis perpendicular to the axis of the shaft 18. The spindles 35A, 35B contain one or threads 36A, 36B. As the fluid or gas passes through the inlet port 14 and across the spindles 35A, 35B, the spindles 35A, 35B rotate. Each rotation of the spindles 35A, 35B represent a given volume of liquid or gas flowing through the meter 10 and being displaced. A hall-effect sensor 26 is provided, like that described previously, to detect the rotation of the spindles 35A, 35B.

The inner housing 12 is surrounded by an outer housing 23 constructed out of a lower permeable material than the inner housing 12, including but not limited to aluminum, plastic, ceramic, ferrous metal, and non-ferrous metal as previously described above. In order to detect the rotation of the spindles 35A, 35B, a port 24 is include in the outer housing 23 during the manufacture of the meter 10 so that the port 24 extends all the way to the surface area of the inner housing 12. The port 24 may be called the "first port." The port 24 allows the sensor 26 to be placed inside the port 24A at the surface area of the inner housing 12. The sensor 24 may be like the Hall-effect sensors that are described above.

The spindle 35 that is located proximate to the sensor is modified to include at least one region of discontinuity 29, which is provided in such a manner as to exhibit magnetic properties. For example, if spindle 35B is made of a magnetic or ferrous material, the region of discontinuity 29 in the outer surface of spindle 35B will generate a characteristic magnetic flux that is detectably distinct from the magnetic flux generated by the adjacent surface regions, which conform to the conventional cylindrical shape for the spindle 35B. As will be described further, these variations in magnetic flux associated with the region of discontinuity 29 is detected by the Hall-effect sensor 26 and is used to provide detection of the rotation of the spindles 35A, 35B. In this illustration of the meter 10 in FIG. 3, the sensor 26 is placed proximate to spindle 35B and thus the region of discontinuity 29 is provide on spindle 35B, but the sensor 26 could be located proximate to spindle 35A to detection rotation of the spindles 35A equally as well since the spindles 35A, 35B are interlocked.

In the example of the axial meter 10 in FIG. 3, the sensor 26 is a Hall-effect sensor 26 that is present in the port 26. The sensor 26 comprises a first Hall-effect sensing element 27 and a second Hall-effect sensing element 28 having respective electrical leads 30. The discrete Hall-effect elements 27, 28 may be provided in any conventional form known to those skilled in the art such as a current-carrying conductor. In accordance with the present invention, the Hall-effect elements 27, 28 are placed in a sufficiently proximate relationship relative to spindle 35B so as to enable the region of discontinuity 29 to exert a characteristic magnetic influence upon each of the Hall-effect elements 27, 28 as the region of discontinuity 29 rotates in succession past elements 27, 28.

In another variation of the embodiment of FIG. 3 not shown, a second port with another sensor may be provided like that of the embodiment in FIG. 2A to allow detection of direction of rotation of the spindle 35B as previously described above.

Figure 4:
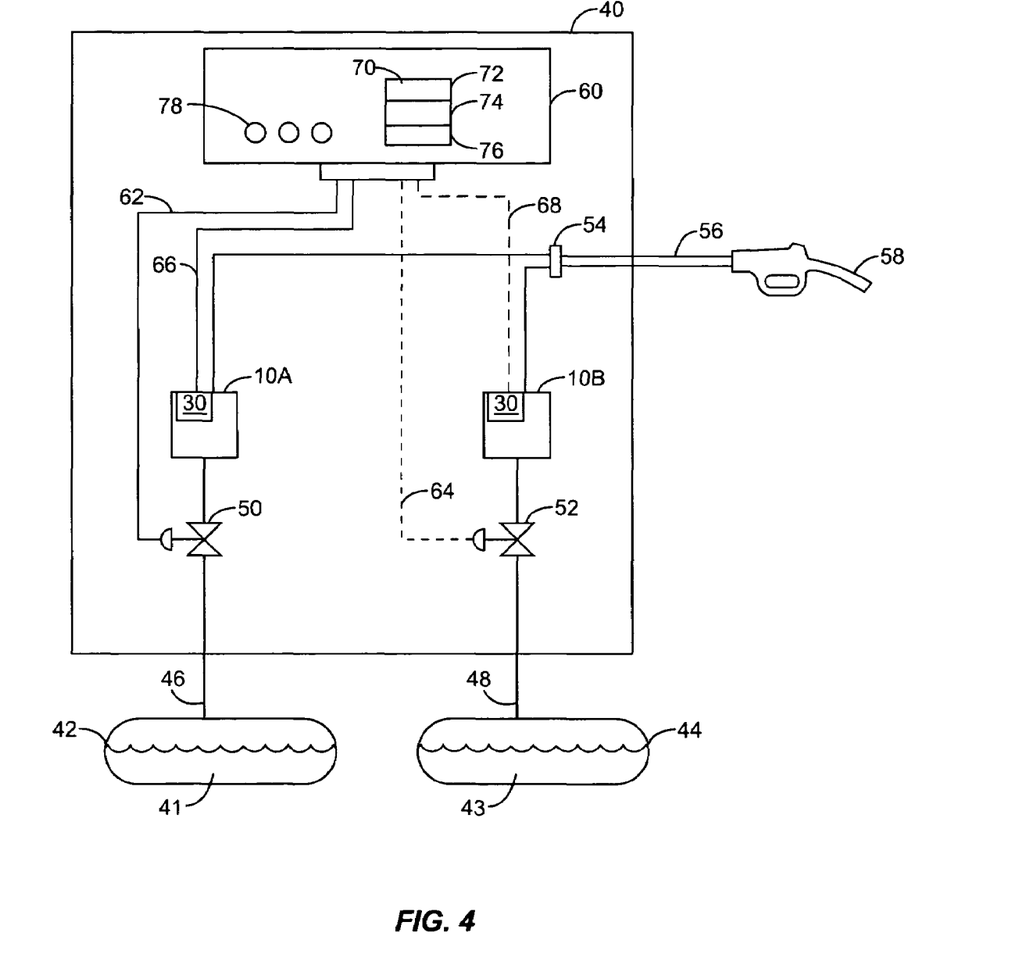
FIG. 4 is a schematic diagram of the meter according used as a fuel metering device in a fuel dispenser for fueling vehicles.

FIG. 4 illustrates use of the meter 10 according to the present invention in a fuel dispenser 40. The purpose of a fuel dispenser 40 is to measure the amount of fuel being delivered to a vehicle (not shown). Very accurate meters are required to measure fuel dispensing to comply with Weights & Measures regulatory requirements. The fuel dispenser 40 may be a blending type fuel dispenser wherein a low-octane fuel 41 stored in a low-octane underground storage tank 42 and a high-octane fuel 43 stored in a high-octane underground storage tank 44 are blended together by the fuel dispenser 40 to deliver either a low-octane fuel 41, high-octane fuel 43, or a mixture of both to a vehicle. The low-octane fuel 41 is supplied to the fuel dispenser 40 through a low-octane fuel supply conduit 46. Likewise, the high-octane fuel 43 is delivered to the fuel dispenser 40 through a high-octane fuel supply conduit 48. Both the low-octane fuel 41 and the high-octane fuel 43 pass through the fuel dispenser 40 in their own independent flow paths. Each fuel 41, 43 encounters a valve 50, 52 that controls whether the fuel is allowed to enter into the fuel dispenser 40, and if so at what flow rate. Valves 50, 52 may be proportionally controlled and are under the control of a controller/control system 60 in the fuel dispenser 40.

The controller 60 determines when a fueling operation is allowed to begin. Typically, a customer is required to push a start button 78 to indicate which octane of fuel 41, 43 is desired, and the controller 60 thereafter controls the valves 50, 52 to allow the low-octane fuel 41 or the high-octane fuel 43 to be dispensed, depending on the type of octane of fuel selected by the customer. After the fuel 41, 43 passes through both the valves 50, 52 (if a blended octane fuel was selected by the customer), the fuels 41, 43 flow through meters 10A, 10B according to the present invention. If only a low-octane fuel 41 or high-octane fuel 43 was selected by the customer to be dispensed, the controller 60 would only open one of the valves 50, 52. As the fuels 41, 43 flow through the meters 10A, 10B, sensors 26A, 26B, 26C (not shown) on each of the meters 10A, 10B produce a pulser signal 66, 68 from electrical leads 30 from sensors 26 on the meters 10A, 10B that is input into the controller 60. The controller 60 determines the amount of flow of fuel flowing through meters 10A, 10B for the purpose of determining the amount to charge a customer for delivery of such fuel. The controller 60 uses the data from the pulser signal 66, 68 to generate a totals display 70.

The totals display 70 is comprised of an amount to be charged to the customer display 72, the amount of gallons dispensed display 74 and the price per unit of fuel display 76. U.S. Pat. No. 4,876,653 entitled "Programmable multiple blender" describes a blender operation like that illustrated in FIG. 3 and is incorporated herein by reference in its entirety. As either the low-octane fuel 41, high-octane fuel 43, or both pass through their respective meters 10A, 10B, the fuels come together in the blend manifold 54 to be delivered through the hose 56 and nozzle 58 into the vehicle.

FIG. 4 illustrates another application for use of the meter 10 in a service station environment. FIG. 4 illustrates an underground storage tank pressure reduction system like that described in U.S. Pat. No. 5,464,466 entitled "Fuel storage tank vent filter system," incorporated herein by reference in its entirety. The fuel dispenser 40 is a vapor recovery fuel dispenser wherein vapor captured during refueling of a vehicle is passed back to the ullage area 82 of an underground storage tank 42, 44 via a vapor return line 88. The ullage area 82 of the underground storage tank 42, 44 contains vapor 80. If the pressure inside underground storage tank 42, 44 rises to a certain level, the membrane system 92 is activated to separate the hydrocarbons from the vapor 80. As the hydrocarbons are separated from the vapor 80, the hydrocarbons are returned to the ullage area 82 of the underground storage tank 42, 44 via a vapor return line 96. The membrane 92 may either permeate hydrocarbons or permeate oxygen or air as disclosed in U.S. Pat. Nos. 5,464,466 and 5,985,002, incorporated herein by reference in their entirety.

The air that is separated from a hydrocarbon in the vapor 80 is then released to atmosphere through a vent stack 90 and a meter 10. The amount of air is measured and then released to atmosphere if there is sufficient pressure to release pressure valve 94. It may be desirable to measure the amount of air flowing through the vent stack 90 using the meter 10 to determine how often and how much air is separated by the membrane 92 and released to atmosphere for any number of diagnostic or information purposes. Because of the small size of the meter 10 and other diagnostic information it can provide, use of the meter 10 in the vent stack 90 may be particularly useful.

Figure 5:
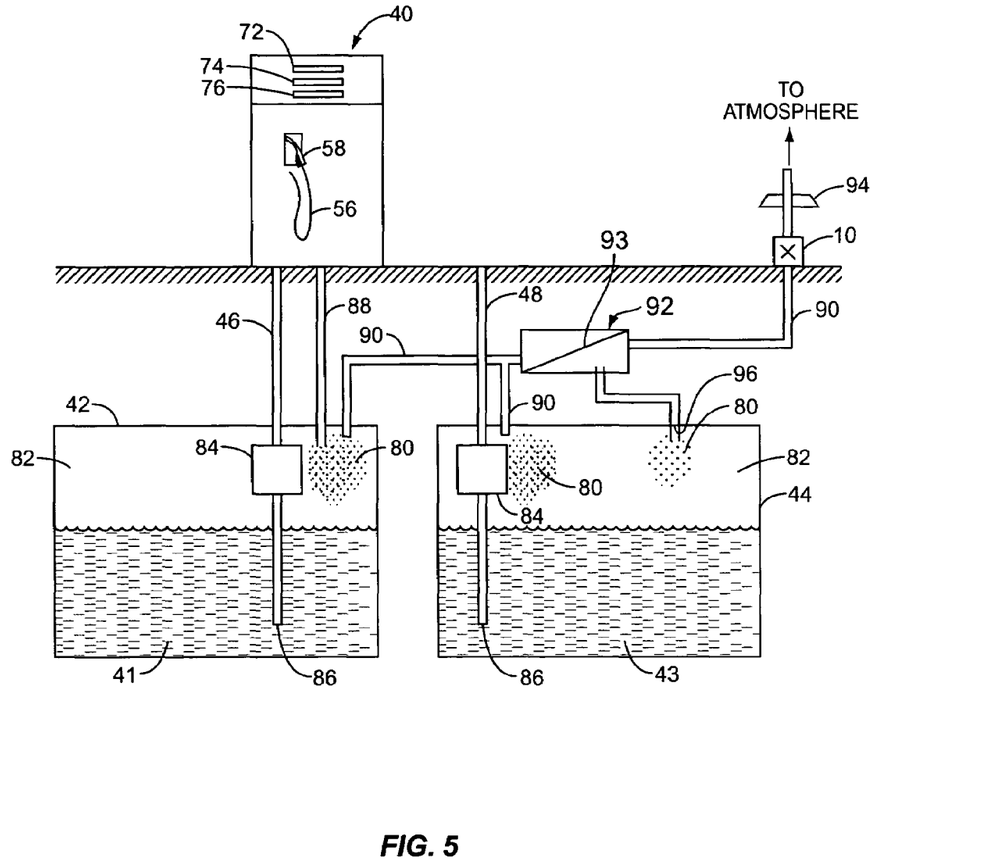
FIG. 5 is a schematic diagram of the meter used as a fugitive emission meter for an underground storage tank in a service station environment.

FIG. 5 describes another application for use of the meter 10 wherein the meter 10 measures the amount of vapor 80 being returned to the underground storage tank 42 in a stage two vapor recovery system. Fuel 41 is delivered from the underground storage tank 42 via a fuel supply conduit 46 to the fuel dispenser 40. As the fuel 41 enters the hose 56 and is delivered to the vehicle 100 through a nozzle 58, the vapor 80 present in the vehicle fuel tank 102 is displaced out of the vehicle 100. The hose 56 and nozzle 58 are configured to provide a separate return path known as a vapor return line 88 to allow vapor 80 to be captured by the fuel dispenser 40. The vapor 80 is returned back to the underground storage tank 42 through the vapor return line 88 into the ullage area 82 of the underground storage tank 42.

As vapor 80 is passed through the vapor return line 88 in the fuel dispenser 40, the vapor 80 passes through a meter 10. The meter 10 measures the amount of vapor flow being returned to the underground storage tank 42 for the purpose of determining if the fuel dispenser 40 is recovering the correct amount of vapor 80 in relation to the fuel 41 dispensed into the vehicle 100. Since there is a relationship between the amount of fuel 41 dispensed into the vehicle 100 and the amount of vapor 80 displaced from the vehicle fuel tank 102, a relationship can be derived known as the "vapor to liquid ratio" (V/L ratio).

Figure 6:
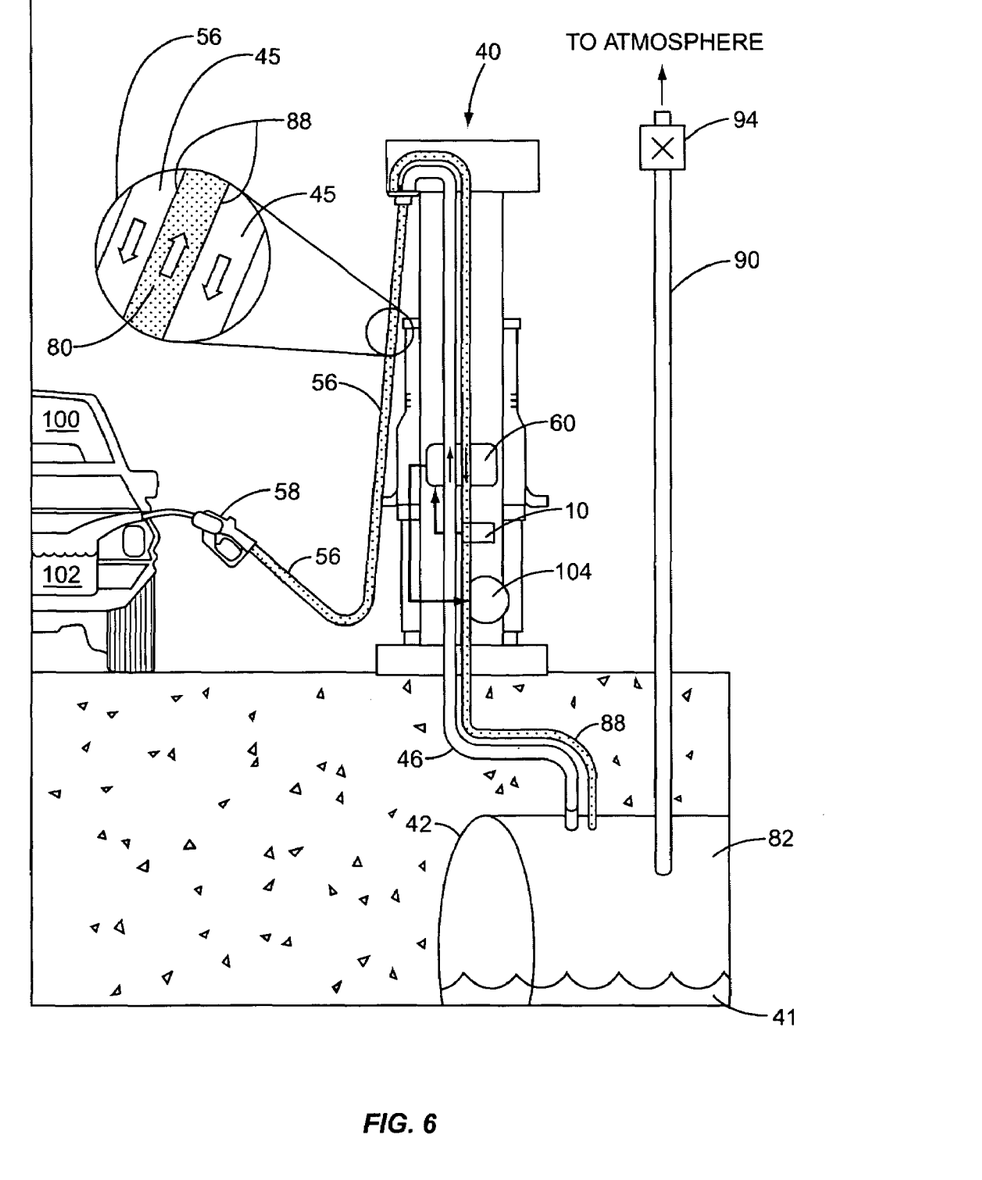
FIG. 6 is a schematic diagram of the meter used as a vapor meter for adjusting the vapor recovery system of a fuel dispenser.

The controller 60 is configured to determine the V/L ratio by calculating the V/L ratio as determined by the pulse signal from the meter 10, which may be called a vapor flow meter, in the vapor return line 88 (numerator), and the pulse signal from the meter 10 that measures the amount of fuel 41 dispensed into the vehicle 100 (denominator). FIG. 6 illustrates a flow chart for one embodiment wherein a fuel dispenser 40 calculates the V/L ratio and adjusts the fuel dispenser 40 vapor recovery system in response.

The process starts (block 110), and the fuel dispenser 40 starts a vapor recovery pump 104 to create a vacuum in the vapor return line 88 (block 112). As fuel 41 is dispensed into the vehicle fuel tank 102, vapor 80 is returned in the vapor return line 88 and flows through the meter 10. The pulser output from the meter 10 is communicatively coupled to a controller 60 in the fuel dispenser 40. The controller 60 measures the amount of vapor flow in the vapor return line 88 being returned to the underground storage tank 42 (block 114). The controller 60 then divides the amount of vapor flow by the fuel flow rate to arrive at a V/L ratio (block 116).

The controller 60 next determines if the V/L ratio is within desired limits (decision 118). If the V/L ratio is within desired limits, the process determines if fueling has been completed (decision 120). If so, the process ends (block 122). If not, the controller 60 continues to measure the vapor flow and calculate the V/L ratio to determine if it is within desired limits (blocks 114, 116, 118). If the V/L ratio was not within the desired limits (decision 118), the controller 60 adjusts the vapor pump 104 and/or vapor recovery system to adjust the V/L ratio to attempt to put it within desired limits (block 124). This may be done by any number of methods, including adjusting the speed of the vapor pump 104 or adjusting vapor valves (not shown) that control the amount of vapor 80 being returned to the underground storage tank 42. More information on stage two vapor recovery systems for fuel dispensers may be found in patents Reissue No. 35,238, U.S. Pat. Nos. 6,170,539; 6,336,479; 6,338,369; and 6,386,246, all of which are incorporated herein by reference in their entireties.

Figure 7:
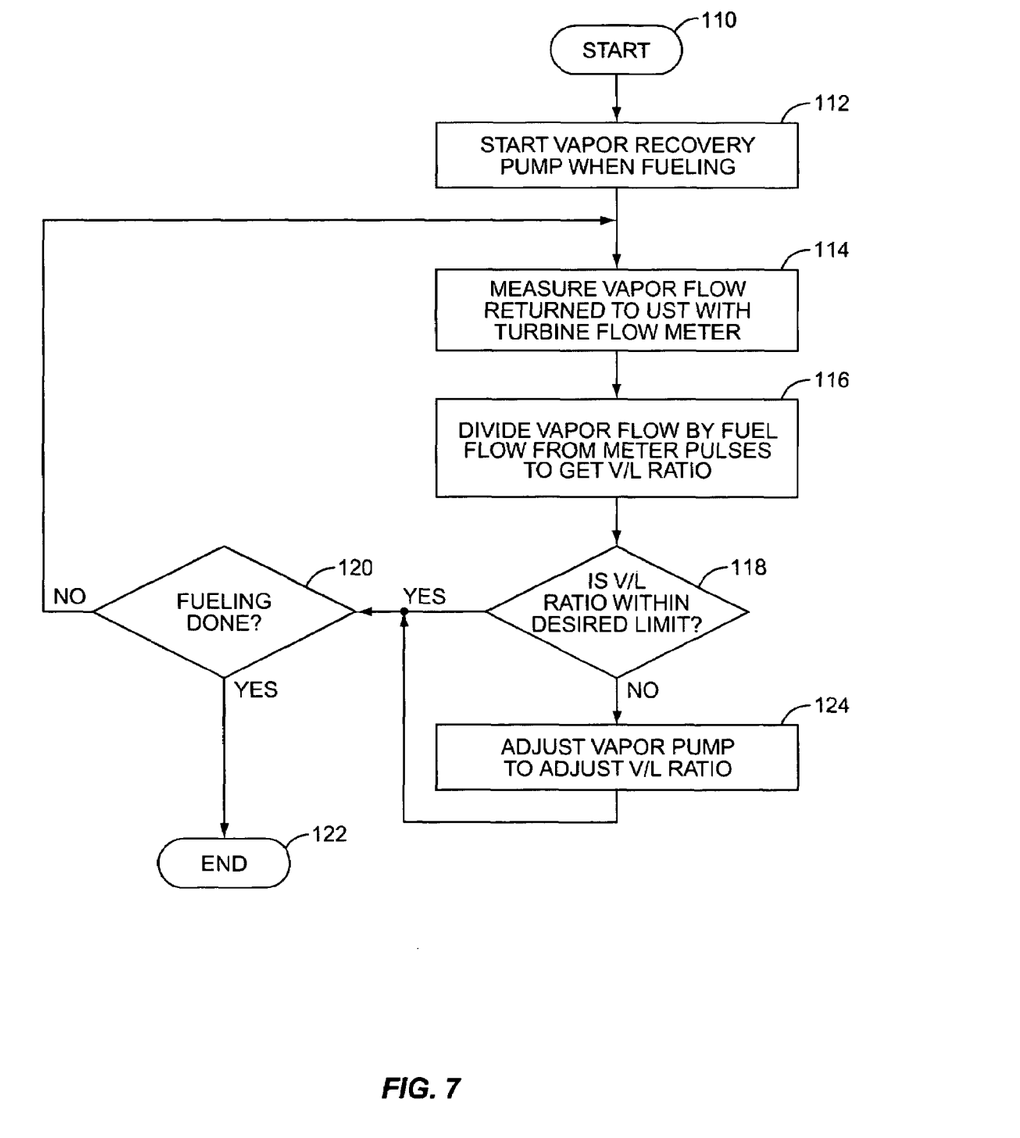
FIG. 7 is a schematic diagram of the flowchart process of adjusting the vapor recovery system of a fuel dispenser based on use of the meter as a vapor meter, as illustrated in FIG. 5.
Figure 8:
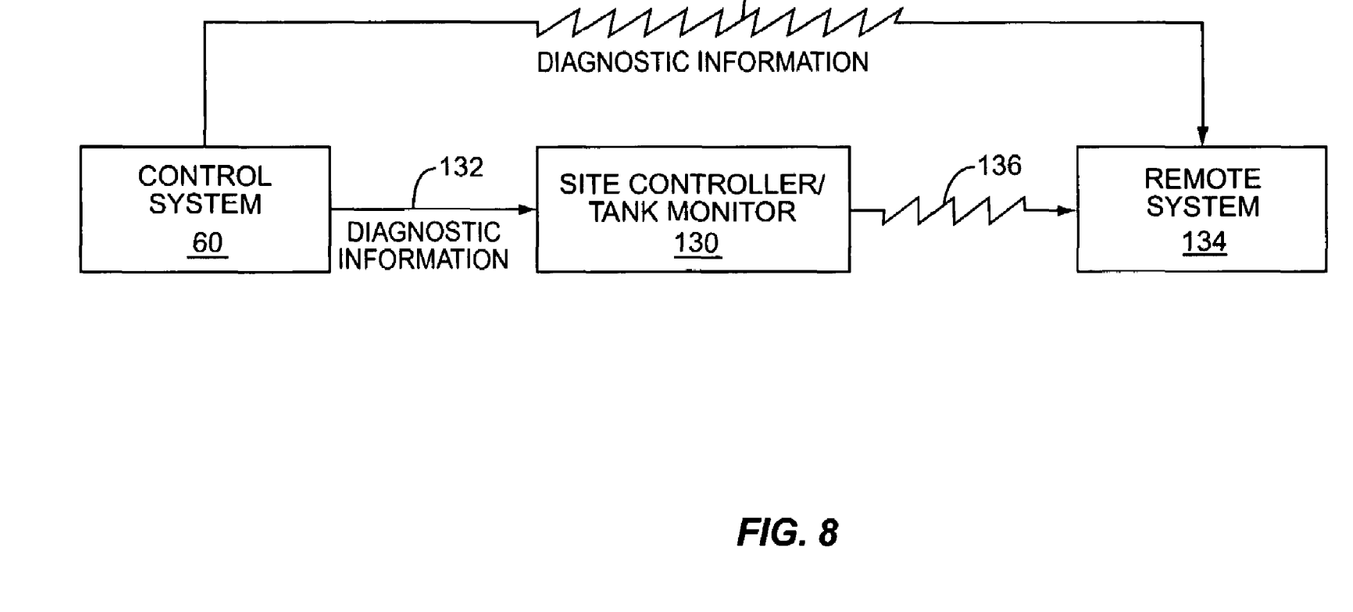
FIG. 8 is a schematic diagram of a diagnostic reporting architecture for the meter.

FIG. 7 illustrates a communication architecture whereby flow data from the meter is communicated to other systems. As previously described, the flow data from the meter 10 is communicated to the controller 60 for processing and measuring purposes, including the applications previously described. The controller 60 may then pass the diagnostic information to a site controller/tank monitor 130 over a local communication line 132 for purposes such as diagnostics or any other application desired. The site controller/tank monitor 130 may in turn pass such information regarding the meter 10 to a remote system 134 via a remote communication line 136 for the same purpose. The controller 60 may also be configured to communicate the flow data from the meter 10 directly to the remote system 134 via the remote communication line 136 rather than through an intermediate site controller/tank monitor 130.

Those skilled in the art will recognize improvements and modifications to the preferred embodiments of the present invention. All such improvements and modifications are considered within the scope of the concepts disclosed herein and the claims that follow.

For example, it should be understood that the present invention is applicable with any type of meter where a sensor is used to detect a signal indicative of the rotation of a rotating component within the meter through a housing. The meter 10 may be a positive displacement or inferential meter. The rotating components may be any type of component that rotate or move when material passes through the meter. The term sensor encompasses any type of sensor or sensing device and is not limited to a Hall-effect or other type of sensor.

What is claimed is:

1. A meter that measures the flow of a liquid or vapor, comprising:
    an outer housing comprised of a low permeable material forming an inlet port on one end of said outer housing and an outlet port on the other end of said outer housing;
    a shaft supported inside said outer housing along an axis parallel to said outer housing;
    a rotational component mounted on said shaft, wherein said rotational component rotates when the liquid or vapor flows through said inlet port;
    an orifice contained in said outer housing that forms a first port wherein a first end of said orifice extends outward to the outer surface of said outer housing, and said second end of said orifice extends down to a higher permeable inner housing proximate to said rotational component; and
    a first sensor that is mounted within said first port to detect the rotation of said rotational component through said inner housing as said rotational component rotates.

2. The meter of claim 1, further comprising a second rotational component mounted on said shaft that rotates oppositely from said rotational component.

3. The meter of claim 1, wherein said inner housing is made from a material comprised from the group consisting of monel, a nickel-copper alloy, steel, stainless steel, and 400-series non-magnetic stainless steel.

4. The meter of claim 1, wherein said outer housing is made from a material comprised from the group consisting of aluminum, plastic, ceramic, ferrous metal, and non-ferrous metal.

5. The meter of claim 1, wherein said rotational component is a turbine rotor that comprises a plurality of vanes that cause said turbine rotor to rotate when said liquid or vapor comes into contact with said plurality of vanes.

6. The meter of claim 1, wherein said rotational component is a spindle that comprises a plurality of threads that cause said spindle to rotate when said liquid or vapor comes into contact with said threads.

7. The meter of claim 1, further comprising:
    a second orifice contained in said outer housing that forms a second port wherein a first end of said second orifice extends outward to the outer surface of said outer housing, and said second end of said second orifice extends down to a higher permeable inner housing proximate to said rotational component; and
    a second sensor that is mounted within said second port to detect the rotation of said rotational component through said inner housing as said rotational component rotates.

8. The meter of claim 7, wherein said first sensor and said second sensor are Hall-effect sensors.

9. The meter of claim 1, wherein said inner housing is comprised of a plug that is substantially the same size in diameter as said orifice.

10. The meter of claim 1, wherein said inner housing is comprised of a cylindrical-shaped material that is placed in between said shaft and said outer housing.

11. The meter of claim 1, wherein said first sensor is a Hall-effect sensor.

12. A fuel dispenser for dispensing fuel to a vehicle, comprising:
    a nozzle;
    a hose connected to said nozzle;
    a control system;
    a fuel delivery line having an inlet port that receives fuel, and an outlet port that couples to said hose;
    a valve located inline said fuel delivery line and under control of said control system, wherein said control system opens said valve to allow fuel to flow through said fuel delivery line to be delivered through said hose and said nozzle to the vehicle; and
    a meter located inline said fuel delivery line, comprising:
        an outer housing comprised of a low permeable material forming an inlet port on one end of said outer housing and an outlet port on the other end of said outer housing;
        a shaft supported inside said outer housing along an axis parallel to said outer housing;
        a rotational component mounted on said shaft, wherein said rotational component rotates when the fuel flows trough said inlet port;
        an orifice contained in said outer housing that forms a first port wherein a first end of said orifice extends outward to the outer surface of said outer housing, and said second end of said orifice extends down to a higher permeable inner housing proximate to said rotational component; and
        a first sensor that is mounted within said first port to detect the rotation of said rotational component through said inner housing as said rotational component rotates;
        said meter measures the amount of fuel traveling through said fuel delivery line and sends a signal indicative of the amount of fuel to said control system.

13. The fuel dispenser of claim 12, wherein said meter further comprises a second rotational component mounted on said shaft that rotates oppositely from said rotational component.

14. The fuel dispenser of claim 12, wherein said rotational component is a turbine rotor comprising a plurality of vanes that cause said turbine rotor to rotate when said fuel comes into contact with said plurality of vanes.

15. The fuel dispenser of claim 12, wherein said rotational component is a spindle that comprises a plurality of threads that cause said spindle to rotate when said fuel comes into contact with said threads.

16. The fuel dispenser of claim 12, wherein said meter further comprises:
    a second orifice contained in said outer housing that forms a second port wherein a first end of said second orifice extends outward to the outer surface of said outer housing, and said second end of said second orifice extends down to a higher permeable inner housing proximate to said rotational component; and
    a second sensor that is mounted within said second port to detect the rotation of said rotational component through said inner housing as said rotational component rotates.

17. The fuel dispenser of claim 16, wherein said first sensor and said second sensor are Hall-effect sensors.

18. The fuel dispenser of claim 17, wherein said signal is communicated by electrical leads coupled to said Hall-effect sensors.

19. The fuel dispenser of claim 12, wherein said inner housing is comprised of a plug that is substantially the same size in diameter as said orifice.

20. The fuel dispenser of claim 12, wherein said inner housing is comprised of a cylindrical-shaped material that is placed in between said shaft and said outer housing.

21. The fuel dispenser of claim 12, further comprising a totals display that displays the total amount of fuel metered through said meter.

22. The fuel dispenser of claim 12, wherein said first sensor is a Hall-effect sensor.

23. The fuel dispenser of claim 22, wherein said signal is communicated by electrical leads coupled to said Hall-effect sensor.

24. A vapor recovery system, comprising:
an underground storage tank that contains fuel and vapor;
a vent coupled to said underground storage tank;
a membrane coupled inline to said vent that receives said vapor from said underground storage tank and substantially separates said vapor into a hydrocarbon mixture and an air mixture;
a pressure valve coupled inline to said vent downstream of said membrane wherein said pressure valve is opened to release said air mixture to atmosphere when said underground storage tank is under a threshold pressure and said hydrocarbon mixture is returned back to said underground storage tank; and
a meter that measures the amount of air being released to atmosphere, comprising:
an outer housing comprised of a low permeable material forming an inlet port on one end of said outer housing and an outlet port on the other end of said outer housing;
a shaft supported inside said outer housing along an axis parallel to said outer housing;
a rotational component mounted on said shaft, wherein said rotational component rotates when said fuel flows through said inlet port;
an orifice contained in said outer housing that forms a first port wherein a first end of said orifice extends outward to the outer surface of said outer housing, and said second end of said orifice extends down to a higher permeable inner housing proximate to said rotational component; and
a first sensor that is mounted within said first port to detect the rotation of said rotational component through said inner housing as said rotational component rotates;
said meter generates a signal indicative of the amount of air mixture traveling through said vent.

25. The system of claim 24, wherein said meter further comprises a second rotational component mounted on said shaft that rotates oppositely from said rotational component.

26. The system of claim 24, wherein said rotational component is a turbine rotor that comprises a plurality of vanes that cause said turbine rotor to rotate when said air mixture comes into contact with said plurality of vanes.

27. The fuel dispenser of claim 24, wherein said rotational component is a spindle that comprises a plurality of threads that cause said spindle to rotate when said air mixture comes into contact with said threads.

28. The system of claim 24, wherein said meter further comprises:
a second orifice contained in said outer housing that forms a second port wherein a first end of said second orifice extends outward to the outer surface of said outer housing, and said second end of said second orifice extends down to a higher permeable inner housing proximate to said rotational component; and
a second sensor that is mounted within said second port to detect the rotation of said rotational component through said inner housing as said rotational component rotates.

29. The system of claim 28, wherein said first sensor and said second sensor are Hall-effect sensors.

30. The system of claim 29, wherein said signal is communicated to a control system by electrical leads coupled to said Hall-effect sensors.

31. The system of claim 24, wherein said inner housing is comprised of a plug that is substantially the same size in diameter as said orifice.

32. The system of claim 24, wherein said inner housing is comprised of a cylindrical-shaped material that is placed in between said shaft and said outer housing.

33. The system of claim 24, wherein said first sensor generates a signal indicative of the amount of air mixture and communicates said signal indicative of the amount of air mixture to a site controller.

34. The system of claim 24, wherein said signal is communicated to a control system.

35. The system of claim 24, wherein said first sensor is a Hall-effect sensor.

36. The system of claim 35, wherein said signal is communicated to a control system by electrical leads coupled to said Hall-effect sensor.

37. A system that captures vapors expelled from a vehicle during refueling and returns the vapors to an underground storage tank, comprising:
a fuel dispenser comprising a control system and a vapor recovery system that captures vapors expelled from the vehicle during refueling and returns the vapors through a vapor return line to the underground storage tank; and
a meter coupled inline to said vapor return line that measures the amount of vapors being returned to the underground storage tank wherein said control system adjusts said vapor recovery system to vary the rate of recovery of the vapors based on the measurement of the amount of vapors being returned to the underground storage tank, said meter comprising:
an outer housing comprised of a low permeable material forming an inlet port on one end of said outer housing and an outlet port on the other end of said outer housing;
a shaft supported inside said outer housing along an axis parallel to said outer housing;
a rotational component mounted on said shaft, wherein said rotational component rotates when the vapors flows through said inlet port;
an orifice contained in said outer housing that forms a first port wherein a first end of said orifice extends outward to the outer surface of said outer housing, and a second end of said orifice extends down to a higher permeable inner housing proximate to said rotational component; and
a first sensor that is mounted within said first port to detect the rotation of said rotational component through said inner housing as said rotational component rotates;
said first sensor generates a signal indicative of the amount of vapors passing through said meter.

38. The system of claim 37, wherein said meter further comprises a second rotational component mounted on said shaft that rotates oppositely from said rotational component.

39. The system of claim 37, wherein said rotational component comprises a turbine rotor contains a plurality of vanes that cause said turbine rotor to rotate when said vapors come into contact with said plurality of vanes.

40. The system of claim 37, wherein said rotational component is a spindle that comprises a plurality of threads that cause said spindle to rotate when said vapors come into contact with said threads.

41. The system of claim 37, wherein said meter further comprises:
 a second orifice contained in said outer housing that forms a second port wherein a first end of said second orifice extends outward to the outer surface of said outer housing, and said second end of said second orifice extends down to a higher permeable inner housing proximate to said rotational component; and
 a second sensor that is mounted within said second port to detect the rotation of said rotational component through said inner housing as said rotational component rotates.

42. The system of claim 41, wherein said first sensor and said second sensor are Hall-effect sensors.

43. The system of claim 42, wherein said signal is communicated to another control system by electrical leads coupled to said Hall-effect sensors.

44. The system of claim 37, wherein said inner housing is comprised of a plug that is substantially the same size in diameter as said orifice.

45. The system of claim 37, wherein said inner housing is comprised of a cylindrical-shaped material that is placed in between said shaft and said outer housing.

46. The system of claim 37, wherein said signal indicative of the amount of vapor passing through said meter is communicated to a site controller.

47. The system of claim 37, wherein said control system divides the amount of vapor by the amount of fuel dispensed by said fuel dispenser to determine a vapor-to-liquid (V/L) ratio.

48. The system of claim 47, wherein said control system adjusts said vapor recovery system in order to maintain a desired V/L ratio.

49. The system of claim 37, wherein said signal is communicated to another control system.

50. The system of claim 37, wherein said first sensor is a Hall-effect sensor.

51. The system of claim 50, wherein said signal is communicated to another control system by electrical leads coupled to said Hall-effect sensor.

52. A method of measuring the flow rate of a liquid or vapor, comprising the steps of:
 passing a material through an inlet port of an inner housing comprised of a high permeable material;
 rotating a rotational component mounted inside said inner housing as said materials passes through said inner housing;
 receiving a signal from a first sensor mounted on said inner housing proximate to said rotational component and within a first port in an outer housing of a low permeable material formed around said inner housing to detect rotation of said rotational component; and
 correlating the rotation of said rotational component into a flow rate or volume of said material.

53. The method of claim 52, further comprising the steps of:
 receiving a second signal from a second sensor offset from said first sensor and mounted on said inner housing proximate to said rotational component and within a second port in said outer housing to detect rotation of said rotational component; and
 determining the direction of rotation of said rotational component based on said signal and said second signal.

54. A method of manufacturing a turbine flow meter, comprising the steps of:
 forming an outer housing constructed of a low permeable material; placing an orifice in said outer housing that forms a first port wherein a first end of said orifice extends outward to the outer surface of said outer housing, and said second end of said orifice extends down to a higher permeable inner housing;
 placing a rotational component on a shaft; and
 placing said shaft inside said outer housing on an axis in parallel with said outer housing to locate said rotation component proximate said first port.

55. The method of claim 54, further comprising mounting a first sensor inside said first port to locate said first sensor proximate said rotational component.

56. The method of claim 54, further comprising placing a second port in said outer housing offset from said first port and located proximate to the location of said rotational component that extends down to the outer surface of said inner housing.

57. The method of claim 56, further comprising mounting a second sensor inside said second port to locate said first sensor proximate said rotational component.

* * * * *